United States Patent [19]

Arnold et al.

[11] 4,014,567

[45] Mar. 29, 1977

[54] APPARATUS FOR COUPLING PIPE OR THE LIKE

[75] Inventors: James F. Arnold, Houston, Tex.;
Glen E. Lochte, Asker, Norway;
Anthony B. Duncan, Missouri City, Tex.

[73] Assignee: Hydro Tech International, Inc., Houston, Tex.

[22] Filed: Sept. 8, 1975

[21] Appl. No.: 611,406

Related U.S. Application Data

[63] Continuation-in-part of Ser. No. 466,039, May 1, 1974, abandoned.

[52] U.S. Cl. .................................. 285/24; 61/87; 166/.6; 285/96; 285/317; 285/331; 285/332.3; 285/DIG. 21
[51] Int. Cl.² .................................. F16L 55/00
[58] Field of Search .......... 285/317, 308, 309, 331, 285/332.3, 24, 27, 18, DIG. 21, 315, 316, 404, 277, 96; 166/.6

[56] References Cited

UNITED STATES PATENTS

| 726,077 | 4/1903 | Lehotzky | 285/331 X |
| 2,695,184 | 11/1954 | Hobbs | 285/331 X |
| 3,228,715 | 1/1966 | Neilon et al. | 285/317 X |
| 3,338,596 | 8/1967 | Knox | 285/315 X |
| 3,536,344 | 10/1970 | Nelson | 285/315 |

FOREIGN PATENTS OR APPLICATIONS

608,412  9/1948  United Kingdom ............... 285/331

*Primary Examiner*—Thomas F. Callaghan

[57] ABSTRACT

Apparatus for connecting the ends of pipes or the like. The apparatus includes a pair of coupling members, each being mountable at one end thereof to the end of one of the pipes which are to be connected. One of the coupling members has attached at the other end thereof an annular outwardly extending flange having forward and rearward sides. The flange is preferably dovetailed in cross-section. The other member is provided with a housing for receiving the flange in mating and locking engagement therewith. A plurality of cam members are carried by the housing and are radially movable between a retracted position in which the flange is receivable by the housing and an extended position in which the cam members are engaged with the rearward side of the flange to drive it into locking engagement with the housing. Means are also provided for releasably tying or interlocking the housing to the other coupling so as to prevent undesired radial outward deformation of the housing upon actuation of the cam members when the two coupling members are coupled together. Means such as hydraulic cylinder assemblies are also provided for moving the cam members between the retracted position to the extended position to accomplish the aforesaid joining and interlocking of the coupling members.

16 Claims, 7 Drawing Figures

APPARATUS FOR COUPLING PIPE OR THE LIKE

CROSS REFERENCE TO RELATED APPLICATIONS

This application is a continuation-in-part of U.S. application Ser. No. 466,039 filed May 1, 1974, entitled "Pipe Coupling or the Like " now abandoned.

BACKGROUND OF THE INVENTION

This invention relates to a pipe coupling apparatus for joining pipes such as two pipes which are positioned in a difficult working environment, as for example, floating in water in an offshore location. More specifically, this invention relates to a apparatus for connecting pipe of extremely large diameter, as for example, pipe of the type which are used for constructing offshore installations and in which it may be necessary to effect the coupling operation remotely or in which it is necessary to effect simultaneous coupling of several pairs of large diameter pipe with a minimum of manual manipulation.

DESCRIPTION OF THE PRIOR ART

As the necessity increases for construction of offshore drilling platforms and the like in deep water, it has become more important and necessary to have pipe coupling apparatus which can be manipulated in such environmental condition with a minimum of manual assistance and labor.

Heretofore, offshore structures which were supported on the sea bottom had been limited to water depths of approximately 800 feet or less. It has heretofore been thought that construction of offshore structures in single units have a safe and economical height limitation of not more than about 800 feet. However, when structures are required which are greater than 800 feet in height, they must be constructed in rather safe environments, such as in protected shore waters, and then floated to the desired construction location and thereafter joined in the water. The joining of these sections presents a very difficult problem when the joining location is an unprotected offshore location and, as a consequence, weather conditions may not always be most favorable. Therefore, it is desirable to have apparatus which can be quickly and easily manipulated so as to secure together the ends of large diameter pipe or the like to take advantage of favorable conditions when they do occur. Heretofore, conventional flanges utilizing bolts and nuts or clamps have been used for securing such sections together. However, these types of flanges normally require manual handling and tightening of the bolts and nuts and/or clamps. Since most of the connections will be underwater, the foregoing manipulative steps will be very difficult and time consuming to perform.

SUMMARY OF THE INVENTION

It is therefore an object of this invention to provide an improved apparatus for interconnecting pipes, caissons or the like, particularly or large diameter, in a difficult working environment, as for example in a subsea location and in which connecting operations can be carried out with a minimum of diver assistance and manipulative steps and, in some instances, may be even carried out from a remote location. It is also an object of this invention to provide apparatus whereby large diameter pipe can be joined in a manner that the pipe may thereafter be evacuated of water to provide a dry habitat to facilitate welding or other operations inside the pipe.

Briefly stated, this invention is for apparatus for connecting the ends of a pair of pipes or the like. The apparatus includes a pair of coupling members, each of which is adapted for connection at one end thereof to the end of one of the pipes being connected. One of the coupling members is provided at the opposite end thereof with an annular flange extending radially outwardly therefrom and having forward and rearward sides. The other coupling member is provided with a housing arranged to receive the flange in locking engagement therewith, which housing has a base mateable with the forward side of the flange in the coupled position. A plurality of cam members are carried by the housing and are arranged to be movable between retracted positions in which the flange is receivable by the housing and radially inwardly extended positions in which the cam members are engageable with the rear side of the flange to drive it into locking engagement with the housing. Means, such as hydraulic cylinder assemblies, are also provided for moving the cam members between the retracted and extended positions, as aforesaid.

The apparatus may also include means for releasably tying or otherwise interlocking portions of the two couplings to restrain or impede the tendency of the housing to be radially deformed outwardly during the locking engagement, as described above. These tying or interlocking means may be in the form of a radially extending portion, such as a second flange, attached to the first coupling and spaced axially rearwardly of the first flange. Such second flange may be provided with an annular groove on the forward side which is arranged to receive in interlocking engagement therewith an axially extending forward end portion of the housing, so as to provide an interlock or tie at a plurality of circumferentially spaced positions around said housing to thus increase resistance to the aforesaid tendency for deformation of the housing upon actuation of the cam means.

In some instances, it may be desirable to provide a resilient seal between the forward side of the flange and its mating surface in the housing, which seal may in some instances be separately or independently pressurized for increasing the sealing effect thereof. Further, the flange may be skewed or tapered in a forward direction to effect increased securing of the flange in the housing in the joined or coupled condition.

It is sometimes desirable to have the flange arranged such that a cross-section of the flange is in the form of a dovetail, with the forward side of the flange being mateably engaged with the base in the housing, and the rearward side having a higher degree of slope and engaged by the cam members, to thereby provide a greater entrapping force and a tool which will withstand greater shear forces.

Briefly stated, the method of this invention is for rigidly interconnecting two sections of an offshore drilling platform or the like, wherein each section has a plurality of tubular support members, which members in one section are generally arranged for axial end alignment with the support members of the other section in the assembled condition. It includes the steps of attaching one part of a two-part hydraulically actuated interlocking coupling device to one end of each of the support members in one section, and attaching the other part of each of the coupling devices to the mating end of one of the support members in the other section. The sections are then transported to the offshore location where the drilling platform is to be erected. Sections are then moved to end to end abutting alignment, whereby the parts of each of the coupling devices are axially adjacent. Hydraulic fluid pressure is then applied to the coupling devices to thereby actuate and interlock the coupling devices, thereby interconnecting the sections of the platform. In certain instances, it may be desirable to seal the interface between the two parts of each of the coupling devices to provide a fluid-tight seal therebetween.

The interlocking may be carried out by supporting a plurality of generally radially movable lock members on one part of each of the coupling devices and moving the lock members into locking engagement with the other part of each of the coupling devices by the application of pressurized hydraulic fluid thereto to thereby interlock the parts. It is to be understood that the sections of the offshore platform may be transported to the erection location by floating the same in a body of water and thereafter towing the sections to the erection location. In certain instances, the application of hydraulic fluid may be initiated and controlled from a remote location, and which application may in certain instances be effected simultaneously as to all coupling devices, to thereby instantaneously interconnect the two sections.

DESCRIPTION OF THE PREFERRED EMBODIMENT

Figure 1:
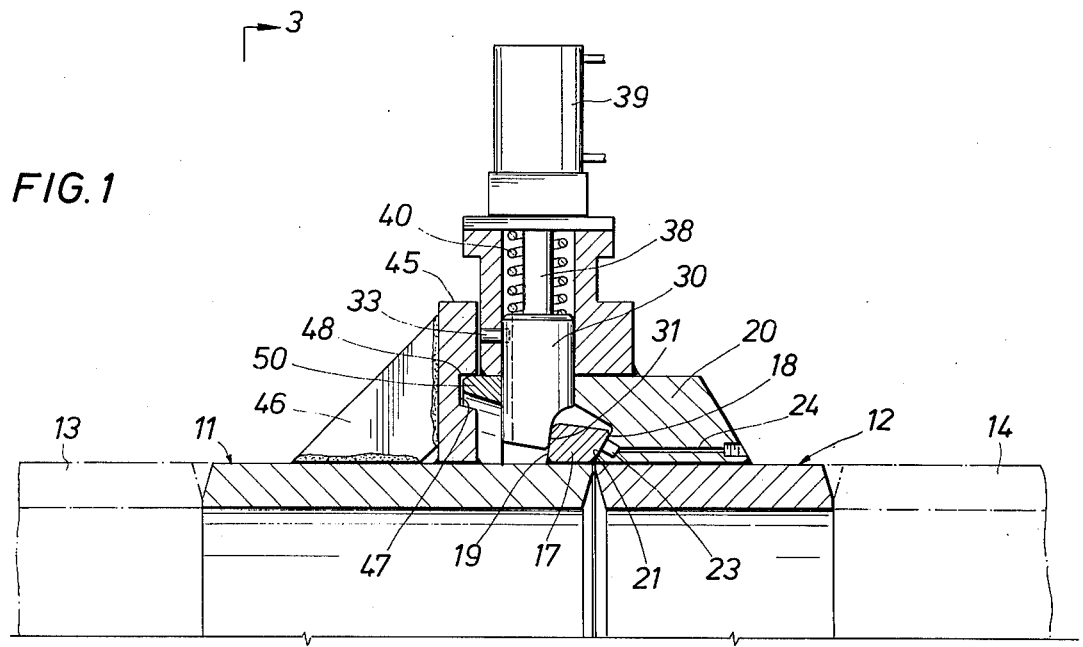
FIG. 1 is a partial, central longitudinal sectional view showing portions of the coupling members of this invention taken generally along line 1—1 of FIG. 3.

Referring now to the drawings, one presently preferred embodiment of the invention will be described. The apparatus of this invention includes a pair of coupling members, as for example, male coupling member 11 and female coupling member 12. Coupling member 11 is arranged for connection, as by welding or the like, to one of the pipes which is to be joined, as for example, the end of pipe 13. Coupling member 12 is arranged for connection, as by welding or otherwise, to the other pipe 14 which is to be joined. Coupling member 11 is provided with an annular outwardly extending flange 17 which is skewed or may otherwise be described as being tilted forward towards coupling member 12. It is provided with a generally frustum-shaped forward side 18 and a similar frustum-shaped rearward side 19. It will be observed that the forward and rearward sides 18 and 19 each describe the surface of a frustum, the bases of which each face generally forward towards coupling member 12. In the preferred embodiment, the slope of rearward side 19 is on the order of 15° from the perpendicular with respect to the center line of the coupling member 11 and is greater than the slope of the forward surface 18, which may be on the order of 30° from the perpendicular with respect to the center line of pipe coupling member 11. This provides a flange 17 which may be described as being dovetailed in cross-section, which provides a greater resistance to shear forces which might be imposed upon the coupling assembly and insures a positive locking action, as will be described hereinafter.

Coupling member 12 is provided with an annular housing 20 having a seating base 21 arranged to matingly receive forward side 18 of flange 17. Seating base 21 may be provided with an annular recess in which is mounted seal means such as resilient elastomeric seal 23 which may be separately pressurized, as for example, through valved port 24 so as to increase the sealing effect between flange 17 and base 21 when the coupling members 11 and 12 are locked together.

Figure 2:
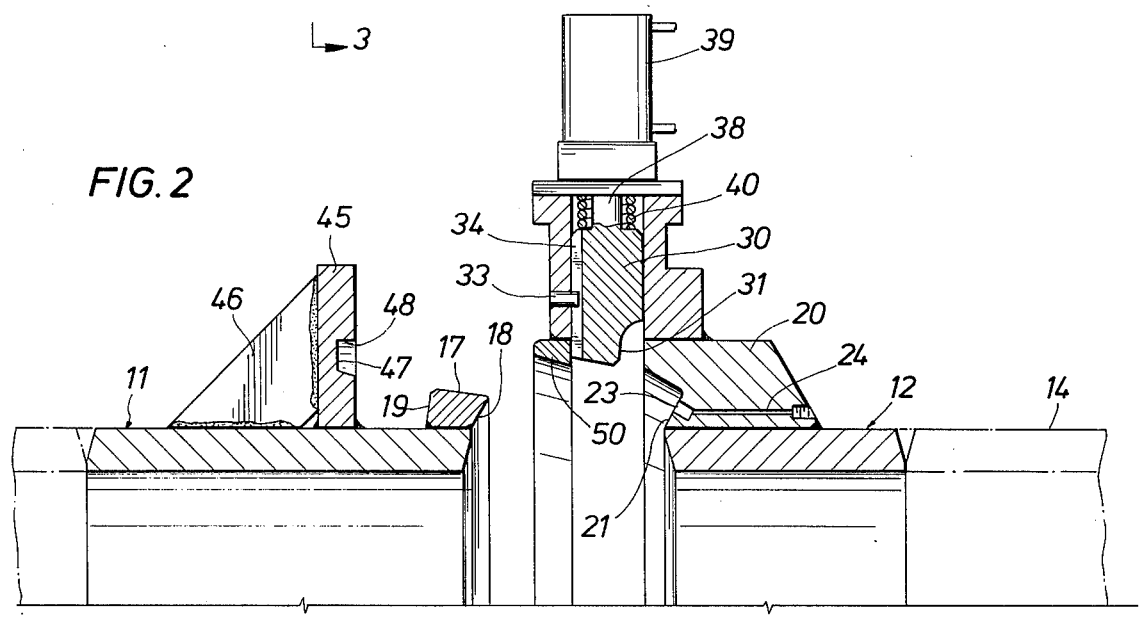
FIG. 2 is a view generally similar to FIG. 1, but showing the two coupling members axially spaced apart just immediately prior to or subsequent to the coupling members being placed or having been placed in the joined condition.

Housing 20 is arranged to carry and support a plurality of wedges or cam members 30 in initially radially retracted circumferentially spaced positions, as generally shown in FIG. 2. In the retracted position, housing 20 easily accommodates the positioning thereon of flange 17. For purposes of convenience, flange 17 may sometimes be referred to herein as the forward flange on coupling member 11.

Each of the cam members 30 is arranged for generally radially inwardly and outwardly movement in housing 20 and are generally round in cross-section taken transverse to the direction of movement thereof as aforesaid. Each of the cam members 30 is provided with a generally flat surface 31 on the rearward side thereof, as shown in FIGS. 1 and 2, which flat surfaces 31 are arranged for camming and locking engagement with rearward side 19 of flange 17 in the actuated position as shown in FIG. 1. Each of the cam members 30 is held against rotation about the axis of movement by means of a guide pin 33 passing through a portion of housing 20 and engaging in appropriate longitudinal guide slot 34 in the forward side of cam members 30, as shown.

Each of the cam members 30 is supported on the radially inward end of a piston rod 38, as by welding, threading or the like, and is arranged for radially inwardly and outwardly movement by operation of a hydraulic piston (not shown) attached to the radially outwardly end of rod 38, and which piston is arranged to move inside of hydraulic cylinder 39 by appropriate application of hydraulic pressure to the ends thereof in conventional manner, and which may be operative from a remote location. In certain embodiments, each cam member 30 may be continuously urged radially inwardly by operation of a compression spring 40 mounted around rods 38 as shown and which springs may be overcome by application of hydraulic pressure to cylinders 39 to move rods 38 radially outwardly to the position shown in FIG. 2.

As described above, this apparatus is particularly useful in connecting pipes or caissons of large diameter, on the order of five or six feet in some instances and, as a consequence, actuation of cam members 30 to the set position and engagement with the rearward side 19 of flange 17 may cause a tendency for housing 20 to be deformed radially outwardly to an undesired and possibly a critical condition because of the large actuation forces exerted by cylinders 39. To alleviate this potential hazard, the apparatus of this invention includes what may sometimes be described as releasable tying means or releasable interlocking means whereby coupling members 11 and 12 are further tied together or otherwise additionally interlocked to forestall the possibility of such undesired deformation.

Accordingly, one form of such tying or interlocking means will now be described. For example, coupling member 11 may be provided with a radially extending enlarged portion mounted axially rearwardly of flange 17 and this may be in the form of rearward flange 45 as shown in the drawing and which is attached as by welding or the like to coupling member 11. To provide additional strength and support to a flange 45, there may be provided and attached thereto by welding or the like, a plurality of circumferentially spaced gusset plates 46 which lie in generally radially extending planes having the inward ends thereof welded or otherwise attached to coupling member 11. Additionally, the forward side of rearward flange 45 may be provided with an annular forwardly facing groove 47 having a cylindrical radially inwardly facing outer shoulder 48 presenting a radially inwardly facing surface.

Figure 4:
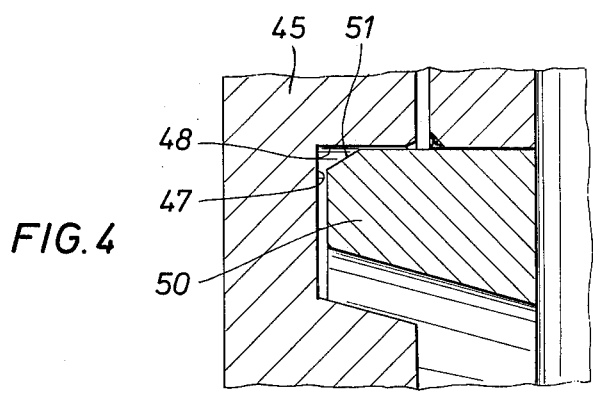
FIG. 4 is a fragmentary view showing in greater detail the tying means for the coupling as shown in FIG. 1.
Figure 3:
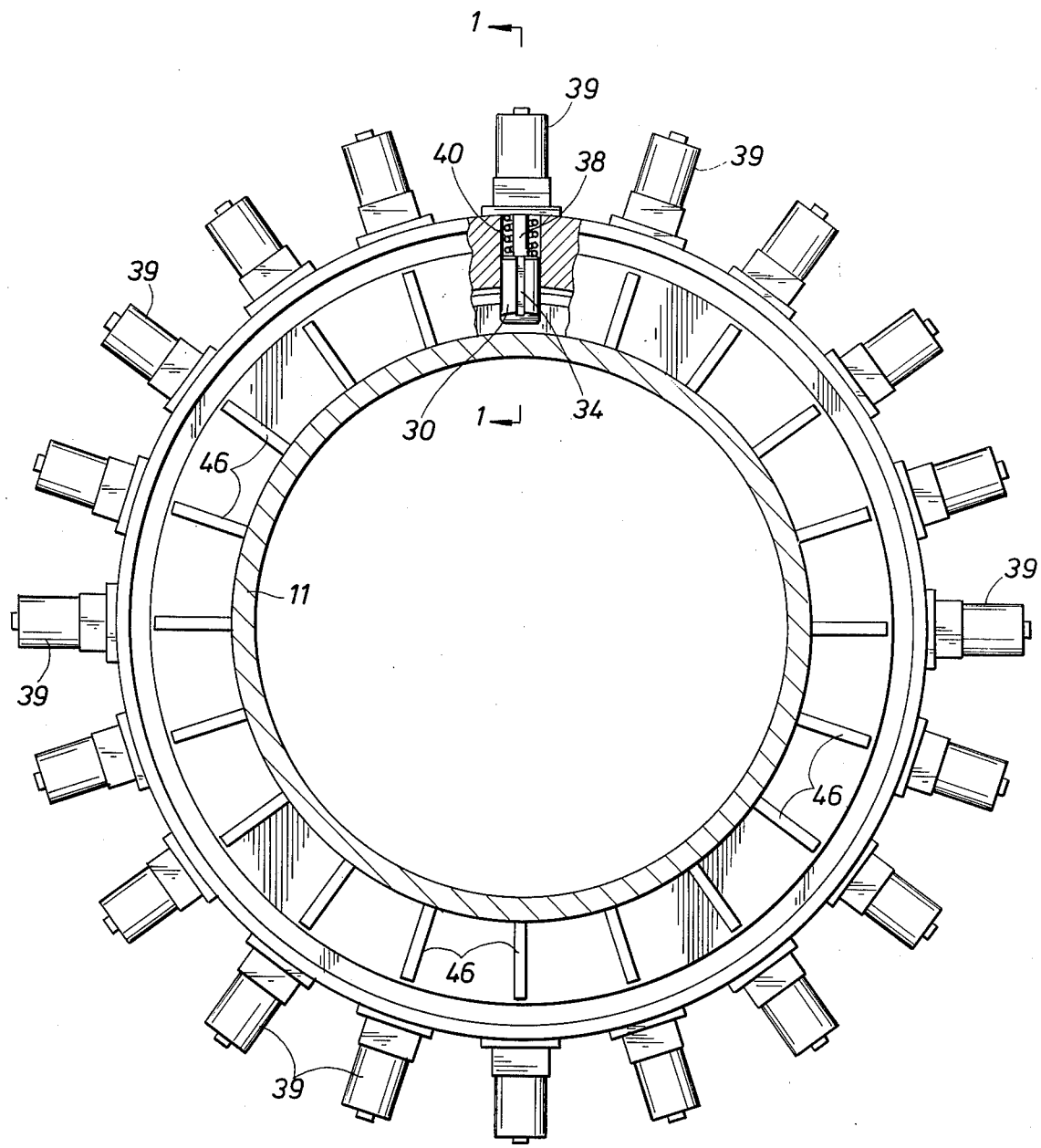
FIG. 3 is an end view of the apparatus, with a portion of the apparatus shown broken away to reveal additional details of one of the cam members and associated elements.

Coupling member 12 may conveniently have attached to the forward end thereof an annular end portion 50 having an annular outer surface which mates with shoulder 48 as shown in FIG. 1. The forward part of end portion 50 may have a small tapered surface 51 to facilitate entry of portion 50 into groove 47, as best seen in FIG. 4. Upon the joining of coupling members 11 and 12 in the position shown in FIG. 1, annular end portion 50 acts as a tongue for interlocking with shoulder 48 of groove 47. This interlocking or tying provides additional support to prevent undesired radial deformation of housing 20, which might otherwise occur during actuation of cam members 30 to the set position as shown in FIG. 1.

It is to be understood that the aforesaid tying or interlocking means may take different forms, as for example, the forward end of coupling member 12 might be provided with an annular groove and flange 45 might be provided with a forwardly facing annular tip portion such that the aforesaid tongue and groove relationship might be reversed. In any event, there would still be provided the necessary additional support and structure to prevent the undesired effects which might otherwise accrue. In addition, it is to be understood that while an annular tongue and groove type construction has been described, alternative forms could be provided so long as there were interlocking or tying means at a plurality of circumferentially spaced positions about the apparatus and which interlocking or tying was effected in response to the joining of the two coupling members.

As discussed above and in certain applications, it is desirable that annular flange 17 be of the aforesaid dovetailed configuration in cross-section, such that the rearward side 19 thereof may be engaged with surfaces 31 of cam members 30 at a lesser angle than is true with respect to the engagement of the forward side 19 with its mating base 21. This arrangement facilitates the entrapment of flange 17 in the housing by operation of cam members 30 and also permits the building of a structure which will withstand greater external forces, as for example, shear forces. In addition, the skewed or forwardly extending arrangement of annular flange 17 relative to base 21 also permits a certain amount of axial misalignment on the order of 3° or the like, as for example, between the central axes of coupling members 11 and 12, and still provides an operable unit which can be effectively coupled.

In operation, coupling member 11 might, for example, be joined as by welding or otherwise to pipe 13 in a protected or otherwise sheltered environment. Similarly, coupling member 12 is connected to pipe 14. Thereafter, the respective pipes 13 and 14 may be incorporated in appropriate subassemblies, which subassemblies are thereafter floated or otherwise moved to the difficult working environment as, for example, in an offshore location where pipes 13 and 14 are to provide portions of an offshore structure and which are to be joined together to form a completed pipe structure or habitat. When the respective subassemblies reach their intended destination and it becomes desirable to complete the joining operation, cam members 30 will be held in the retracted position as shown in FIG. 2. Coupling members 11 and 12 are moved from the position shown in FIG. 2 to the mating position as shown in FIG. 1, at which point cam members 30 are actuated radially inwardly to the position shown in FIG. 1, by application of hydraulic fluid to cylinders 39. This causes cam members 31 to move radially inward and cam and lock annular flange 17 into engagement with base 21.

Thereafter, if it is desirable to increase the sealing effect between couplings 11 and 12, fluid pressure is applied through valved port 24 to actuate seal 23 into sealing engagement with forward side 18 of flange 17. If pipes 13 and 14 are held in a vertical orientation as in the leg of an offshore drilling platform, then seal 23 prevents the encroachment of water to the interior of said pipes, such that the pipes can be evacuated of water to create a dry habitat therewithin. In such environment, the structural integrity of the assembly can be increased by effecting welding at the proximate ends of coupling members 11 and 12 to complete the assembly if desired.

This invention provides an improved pipe coupling apparatus which can be operated with a minimum of manual labor, and which can be performed in a difficult working environment and which, in some instances, may be operated remotely. This characteristic of remote and in some instances simultaneous operation is very important in the case of joining two large sections of an offshore drilling rig, for example, where it is desirable to join a plurality of pairs of such pipe, as for example, 10 or 20, simultaneously when the entire subassemblies are brought to the mating positions. Hence, entire subassemblies can be quickly joined utilizing pipe coupling apparatus of the type discussed above. This can be done more quickly and safely than has been possible heretofore. As a result, it is now feasible to construct larger offshore drilling structures and the like which can be extended to greater depths than has heretofore been normally possible with conventional techniques and apparatus.

In the event coupling members 11 and 12 are not permanently connected by welding, then they may be separated by withdrawing cam members 30 radially outward by appropriate application of hydraulic fluid to cylinders 39.

Figure 5:
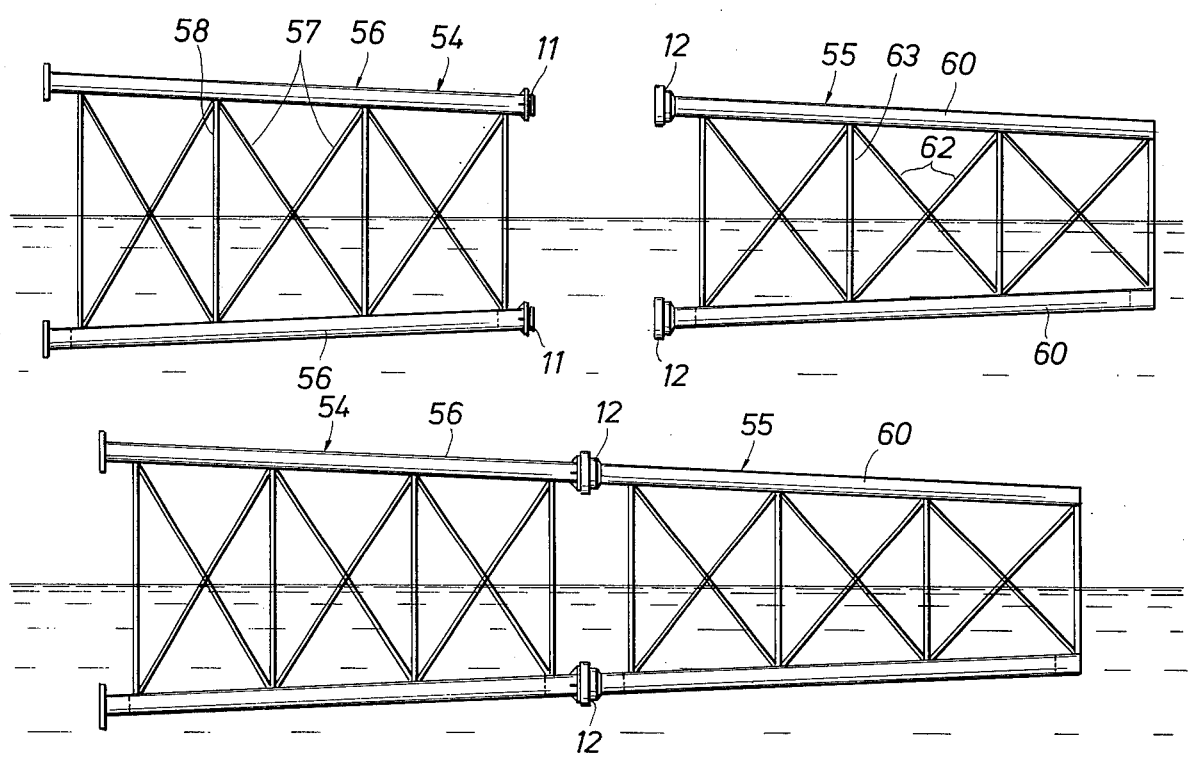
FIG. 5 is a side elevation view of two separated sections of an offshore drilling platform shown being floated in a body of water.
Figure 6:
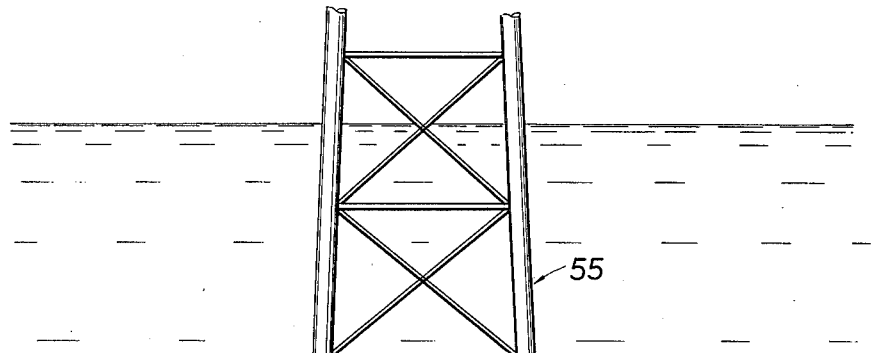
FIG. 6 is a view similar to FIG. 5, but showing the two sections joined.
Figure 7:
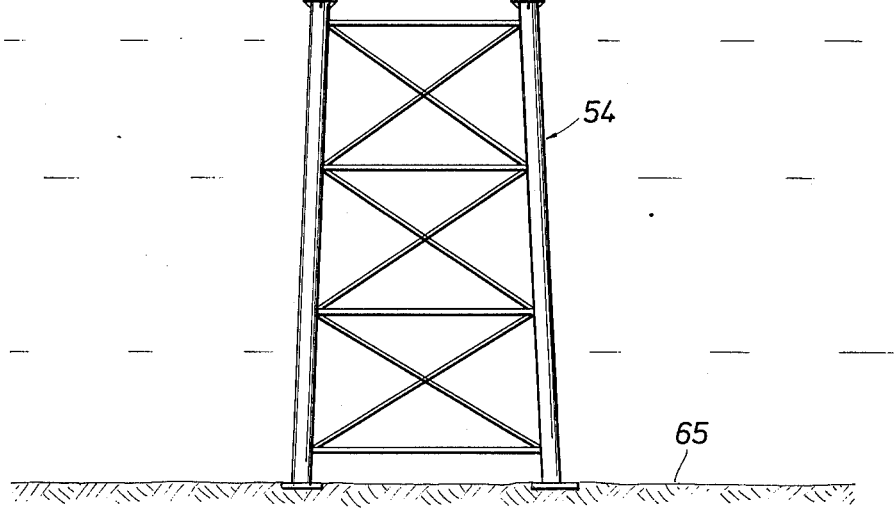
FIG. 7 is a side elevation view of the platform of FIG. 6, but shown in the erected position on a subsea surface and extending above the sea level.

Referring now to FIGS. 5–7 in particular, a method of rigidly interconnecting the sections of an offshore drilling platform or the like will be described. Two such sections of an offshore drilling platform are generally designated by the numerals 54 and 55, respectively, and are shown in FIG. 5 partially submerged in a floating condition in a body of water. Section 54 is comprised of a plurality of support members 56, at least three in number, which are interconnected by a plurality of angular braces 57 and a plurality of perpendicular braces 58, as is conventional with offshore drilling platform structures. In order to provide buoyancy to the structure, the lower support members 56 may have the ends thereof plugged and water evacuated therefrom so as to provide buoyancy to section 54. In the event that additional buoyancy is required to keep section 54 afloat, then auxiliary buoyancy means may be provided as is conventional. The right ends of each of the support members 56 has attached thereto a male coupling member 11 of the type heretofore described and may sometimes be referred to as a part of a two-part coupling device.

Section 55 is generally similar to Section 54 and is similarly provided with a plurality of tubular support members 60, at least three in number, which are interconnected by diagonal braces 62 and perpendicular braces 63. In addition, the submerged support members 60 may be plugged at the ends thereof and water evacuated therefrom to provide the necessary buoyancy for section 55. As with section 54, section 55 may be provided with auxiliary buoyancy means if required to keep the same floating at the desired level in the body of water. In addition, each of the support members 60 has attached to the left end thereof, as viewed in FIG. 5, a female coupling 12 of the type heretofore described and which are arranged for mating with each of the male coupling members 11 attached to support members 56.

It is to be understood that sections 54 and 55 are arranged for towing in a body of water to the desired location where the offshore drilling platform is to be erected. Further, the floating arrangement of sections 54 and 55 as shown in FIG. 5 facilitates the movement thereof to the end to end alignment shown in FIG. 6. As shown there, each male coupling member 11 is shown axially adjacent a female coupling member 12, and when all such male and female coupling members are so arranged, they are simultaneously actuated to the interlocking position by the application of hydraulic fluid pressure thereto in the same manner described with respect to the coupling members shown in FIGS. 1 and 2. If desired, the seals 23 of each of the aforesaid coupling members may be actuated to the sealed position to sealingly interconnect tubular support members 56 with tubular members 60. Moreover, it is usually desirable to actuate the cam members 30 of each of the coupling devices substantially simultaneously to facilitate a quick interconnection of sections 54 and 55 with a minimum of time and supervision. This substantially simultaneous interconnection may be done remotely by controls applying hydraulic pressure through hydraulic lines from a remote location.

With sections 54 and 55 interconnected as shown in FIG. 6 and as described above, the drilling platform then may be moved to the vertical position shown in FIG. 7 by means of controlled sinking of the left end of the structure shown in FIG. 6, as is well known to those skilled in the art, with the result that the structure is then supported on sea bottom 65 as shown in FIG. 7, thereby completing the installation of the platform.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. Apparatus for connecting the ends of a pair of pipes comprising:
   a pair of coupling members, each mountable at one end thereof to the end of one of said pipes;
   one of said coupling members including, at the opposite end thereof, an annular outwardly extending flange having forward and rearward sides;
   the other said coupling member including, at the opposite end thereof, a housing for receiving said flange in locking engagement therewith, said housing having a base mateable with the forward side of said flange in said locking position;
   means axially spaced from said base for releasably tying said housing to said one coupling member to restrain said housing against radially outward movement when said flange is in locking engagement therewith;
   a plurality of cam members carried by said housing in said spacing between said tie means and base, said cam members being movable between a retracted position in which said flange is receivable by said housing and an extended position in which said cam members are engageable with the rearward side of said flange to drive the latter into locking engagement with said housing;
   and means for moving said cam members between said retracted and extended positions.

2. Apparatus as defined in claim 1 wherein:
   said tie means include a surface on each of said coupling members;
   said surfaces being mateable with each other in the locking engagement aforesaid.

3. Apparatus as defined in claim 2 wherein:
   said mateable surfaces constitute part of a tongue and groove connection.

4. Apparatus as defined in claim 3 wherein:
   said tongue is disposed on said housing and said groove is disposed on said one coupling member.

5. Apparatus as defined in claim 4 wherein:
   said groove is located radially outwardly of said flange and said tongue is located radially outwardly of said base whereby said tongue and groove are disposable in confronting relation to each other to effect the connection aforesaid.

6. Apparatus as defined in claim 5 wherein:

said tongue and groove are of annular configuration, respectively.

7. Apparatus as defined in claim 1 wherein:
said moving means includes a plurality of hydraulically actuated piston and cylinder assemblies carried by said housing with one of said pistons being operatively connected to each of said cam members.

8. Apparatus as defined in claim 1 including:
seal means disposable between said base and said forward side for sealing therebetween in the locking engagement aforesaid.

9. Apparatus as defined in claim 8 wherein:
said seal means is carried by said housing.

10. Apparatus as defined in claim 1 wherein:
said rearward side is skewed relative to the longitudinal axis of said one coupling member.

11. In apparatus for connecting the ends of two pipes r the like, the combination comprising:
a pair of coupling members, each of which is adapted for connection at one end thereof to the end of one of said pipes;
a first one of said coupling members having attached to the other end thereof an annular flange extending radially outwardly therefrom, said first coupling member also having a radially extending portion mounted and spaced axially rearwardly of said flange, said radially extending portion forming means for interlocking said first coupling with the other coupling;
said other coupling member having a housing arranged to receive the forward side of said flange in generally mating engagement therewith, and said housing having a forward end portion which is arranged for interlocking engagement with said radially extending portion of said first coupling member at a plurality of circumferentially spaced positions during the joining of said coupling members, to provide increased resistance to axial deformation of said housing;
a plurality of cam members supported by said housing initially in radially retracted circumferentially spaced positions, said cam members being arranged for generally radially inward movement into positive camming and locking engagement with the rearward side of said flange to thereby join said coupling members;
and means for urging said cam members into said camming and locking positions, whereby said coupling members may be locked together and said forward end portion of said housing interlocked with said radially extending portion of said first coupling member.

12. The invention as claimed in claim 11 wherein:
said radially extending portion and said forward end portion is each provided with interlocking surfaces, with the surfaces on one portion being generally opposed to the surfaces of the other portion to provide said interlocking engagement when said coupling members are joined.

13. The invention as claimed in claim 11 wherein:
one of said radially extending portions and said forward end portion is provided with an annular groove having a generally radially inwardly facing shoulder, and the other of said portions is provided with a generally radially outwardly facing shoulder means for engaging said inwardly facing shoulder in interlocking relationship therewith when said coupling members are joined.

14. The invention as claimed in claim 11 wherein:
the forward and rearward sides of said annular flange each defines the shape of a frustum having the base thereof facing forward.

15. The invention as claimed in claim 14 wherein:
the slope of said forward side relative to the central axis of said first coupling member is less than the slope of said rearward side.

16. In apparatus for connecting the ends of two pipes or the like, the combination comprising:
a pair of coupling members, each of which is adapted for connection at one end thereof to the end of one of said pipes;
one of said coupling members having attached to the other end thereof a pair of axially spaced annular flanges extending radially outwardly therefrom, with the rearward one of said flanges having an annular groove in the forward side thereof;
a housing attached to the other end of said other coupling member, said housing being arranged to receive the forward side of the forward one of said flanges in generally mating engagement therewith, and said housing having a forward end portion arranged to engage in said groove in said rearward flange at a plurality of circumferentially spaced positions, to thereby prevent radially outward deformation of said housing upon joining of said coupling members;
a plurality of cam members supported by said housing initially in radially retracted circumferentially spaced positions, said cam members being arranged for generally radially inward movement into positive camming and locking engagement with the rearward side of said forward flange to thereby join said coupling members;
and means for urging said cam members radially inward into engagement with the rearward side of said forward flange, whereby said coupling members may be joined together and said forward end portion of said housing engaged in said groove in said rearward flange.

* * * * *

UNITED STATES PATENT AND TRADEMARK OFFICE
CERTIFICATE OF CORRECTION

PATENT NO. : 4,014,567

DATED : March 29, 1977

INVENTOR(S) : James F. Arnold, Glen E. Lochte, & Anthony B. Duncan

It is certified that error appears in the above-identified patent and that said Letters Patent are hereby corrected as shown below:

Column 1, line 61, "or large" should be --of large--.

Column 4, line 32, "thereon" should be --therein--.

Column 9, line 20, "r" should be --or--.

Signed and Sealed this

Thirty-first Day of May 1977

[SEAL]

Attest:

RUTH C. MASON
Attesting Officer

C. MARSHALL DANN
Commissioner of Patents and Trademarks